(12) United States Patent
Yang et al.

(10) Patent No.: US 7,969,526 B2
(45) Date of Patent: Jun. 28, 2011

(54) DISPLAY DEVICE HAVING CLAMPING UPPER CONTAINER SECTION AND METHOD OF ASSEMBLING THE DISPLAY DEVICE

(75) Inventors: Yong-seok Yang, Asan-si (KR); Sang-soo Kim, Seoul (KR); Jung-tae Kang, Suwon-si (KR); Jin-ho Ha, Suwon-Si (KR)

(73) Assignee: Samsung Electronics Co., Ltd. (KR)

( * ) Notice: Subject to any disclaimer, the term of this patent is extended or adjusted under 35 U.S.C. 154(b) by 193 days.

(21) Appl. No.: 12/240,275

(22) Filed: Sep. 29, 2008

(65) Prior Publication Data
US 2009/0147171 A1 Jun. 11, 2009

(30) Foreign Application Priority Data
Dec. 10, 2007 (KR) .......................... 10-2007-0127676

(51) Int. Cl.
*G02F 1/1333* (2006.01)

(52) U.S. Cl. .......................................... 349/58; 349/187
(58) Field of Classification Search .......................... None
See application file for complete search history.

(56) References Cited

U.S. PATENT DOCUMENTS
6,809,713 B2 * 10/2004 Peng .................................. 345/87

FOREIGN PATENT DOCUMENTS
| JP | 07-092454 | 4/1995 |
| JP | 2003-167230 | 6/2003 |
| KR | 10-2004-0001764 | 1/2004 |

* cited by examiner

*Primary Examiner* — Tina M Wong
(74) *Attorney, Agent, or Firm* — Innovations Counsel LLP

(57) ABSTRACT

A display device is held together by an upper container section and a lower container section joined together, where the upper and lower container sections interlock with one another by virtue of, for example, each having a shape corresponding to that of a frusto rectangular pyramid shell and the upper container section wrapping over and about the lower container section such that they cannot be readily separated.

22 Claims, 8 Drawing Sheets

DISPLAY DEVICE HAVING CLAMPING UPPER CONTAINER SECTION AND METHOD OF ASSEMBLING THE DISPLAY DEVICE

CROSS-REFERENCE TO RELATED APPLICATION

This application claims priority from Korean Patent Application No. 10-2007-0127676 filed on Dec. 10, 2007 in the Korean Intellectual Property Office, the disclosure of which is incorporated herein by reference in its entirety.

BACKGROUND

1. Field of Invention

The present disclosure of invention relates to a display device, to an upper container section thereof, and to a method of assembly the display device, and, more particularly, to a display device assembly which can provide a slim display device having a stable mechanical structure.

2. Description of Related Technology

Liquid crystal displays (LCDs) are widely used as flat panel displays (FPDs). In general, an LCD includes a liquid crystal panel assembly, which has two, generally rectangular panels having opposed electrodes formed thereon and a liquid crystal layer interposed between the two panels. The LCD adjusts the amount of light that is transmitted through various areas (pixel areas) of the liquid crystal layer by varying the voltages applied to the opposed electrodes of each area so that liquid crystal molecules in the liquid crystal layer are rearranged in response. An LCD may also include a backlight assembly which provides light that transmits through the liquid crystal layer and to a user. The backlight assembly may include a plurality of lamps, various optical sheets, and a container for holding the lamps and the optical sheets.

Specifically, an LCD module or assembly may comprise a liquid crystal panel sub-assembly and a backlight sub-assembly, and a structural housing which holds together the various sub-assemblies and/or components of the LCD module. The larger an LCD module is, the greater is the mechanical stress that may be applied to the structural integrity of the LCD structural housing and the greater is the risk that the structural housing will fail to properly hold together the various sub-assemblies and/or components of the LCD module in operable alignment and coupling with one another. In addition, the size of an LCD module imposes restrictions on the size and/or complexity of electronic driving elements that may be housed therein for driving a liquid crystal panel sub-assembly of the LCD module. Therefore, the slimmer an LCD is made, the smaller the available space for housing the driving elements of the LCD panel sub-assembly. Thus, when LCD modules are to be made with a slim profile and yet large display areas, problems emerge with regard to mechanical integrity of the module housing and with regard to amount volume (and/or areas) available inside the module for containing support electronics.

SUMMARY

The present disclosure of invention provides a display device that can be made relatively slim and yet has a relatively stable mechanical structure as compared to older designs.

According to an exemplary embodiment, there is provided a display device including a flat panel subassembly that provides a display image where the flat panel subassembly is secured within a structural housing having an upper container section and a lower container section; and where each of the upper and lower container sections has the shape of a frusto rectangular pyramid and the upper container section pyramidically clamps over and about the lower container section such that the two cannot be readily separated. In one specific embodiment, the upper container section includes a top framing plate that forms a window through which the flat panel subassembly is exposed for viewing of its image. The upper container section includes a plurality of trapezoidal sidewalls extending from outer edges of the top framing plate and merging together to form the frusto rectangular pyramid shape of the upper container. In an alternate embodiment, not all of the sidewalls are trapezoidal, but at least one of the sidewalls of the upper container section forms an acute angle (less than 90°) with the top framing plate of the upper container so as to thereby mechanically lock with a corresponding sidewall portion of the lower container section and prevent easy separation of the upper and lower container sections. In one embodiment, the lower container includes a bottom plate and a plurality of sidewalls formed along the edges of the bottom plate of the lower container, where the lower sidewalls are structured to alignably receive various sub-assemblies and/or components of the LCD module during assembly. The received sub-assemblies and/or components are thereafter secured into place when the upper container section is pyramidically clamped over and about the lower container section.

According to still another aspect of the present disclosure, there is provided a method of assembling a display device, the method including installing a light source module and a flat panel display module in a lower container section, and covering the installed flat panel display module with the upper container section such that the upper container section pyramidically clamped over and about the lower container section. In one embodiment, the upper container section is divided into a plurality of upper container parts that are joined together around the lower container section so as to thereby pyramidically clamped over and about the lower container section.

BRIEF DESCRIPTION OF THE DRAWINGS

The above and other features and advantages of displays in accordance with the present disclosure will become apparent by describing detailed exemplary embodiments thereof with reference to the attached drawings in which.

DETAILED DESCRIPTION

Figure 1:
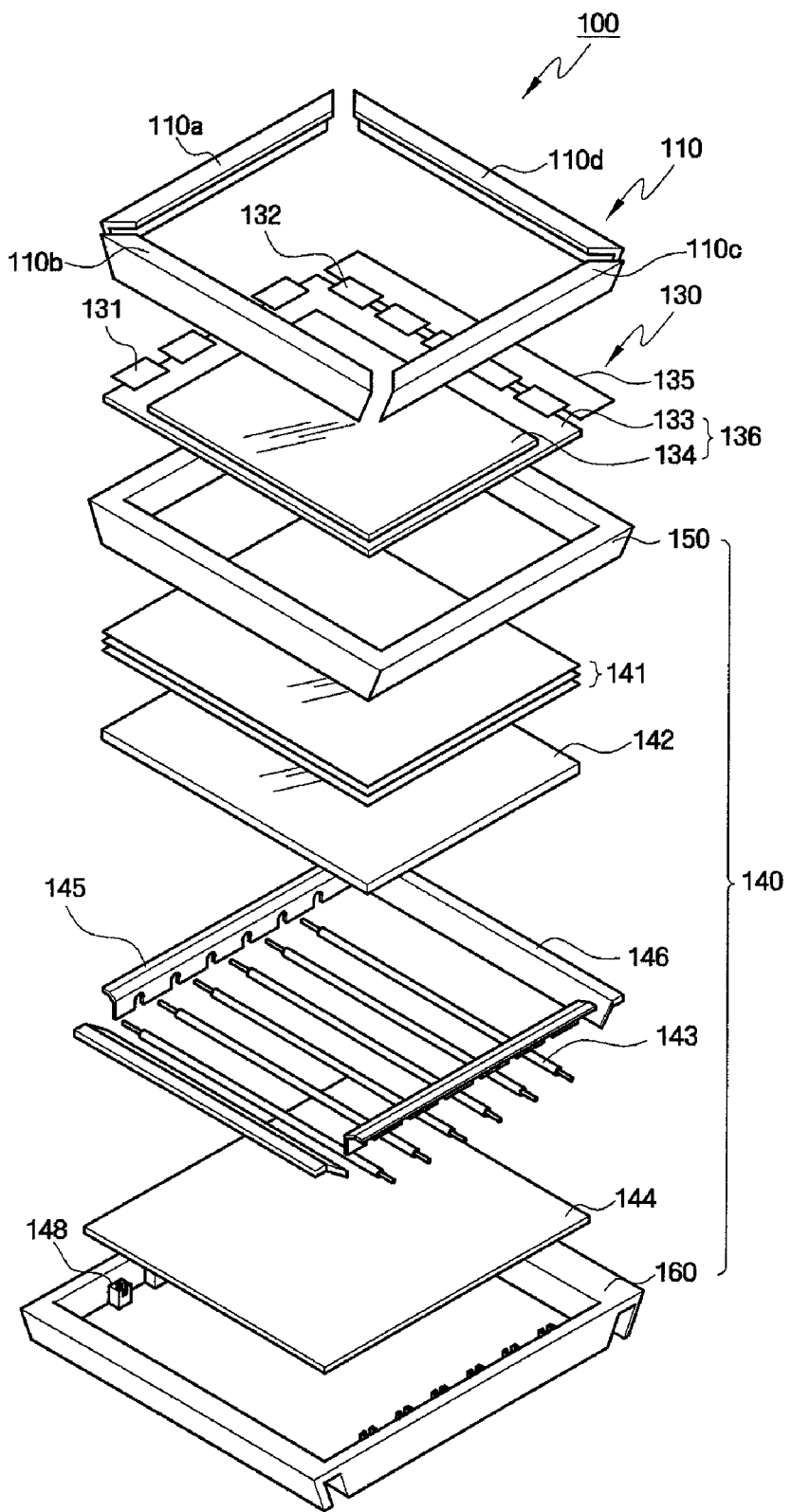
FIG. 1 illustrates an exploded perspective view of a liquid crystal display (LCD) module according to an embodiment.

The present disclosure of invention should not be construed as being limiting due to the specific embodiments set forth herein. Rather, these embodiments are provided so that this disclosure may convey various concepts thereof to those skilled in the art. Like reference numerals in the drawings denote like elements, and thus repetition of their description will generally be omitted.

A first embodiment of a liquid crystal display (LCD) according to the present disclosure includes an LCD module having a structural housing for holding together various subassemblies the LCD module. The LCD module and the coupling between the various subassemblies of the LCD module and the structural containment provided by the housing will hereinafter be described in detail with reference to FIGS. 1 through 4B.

Figure 2A:
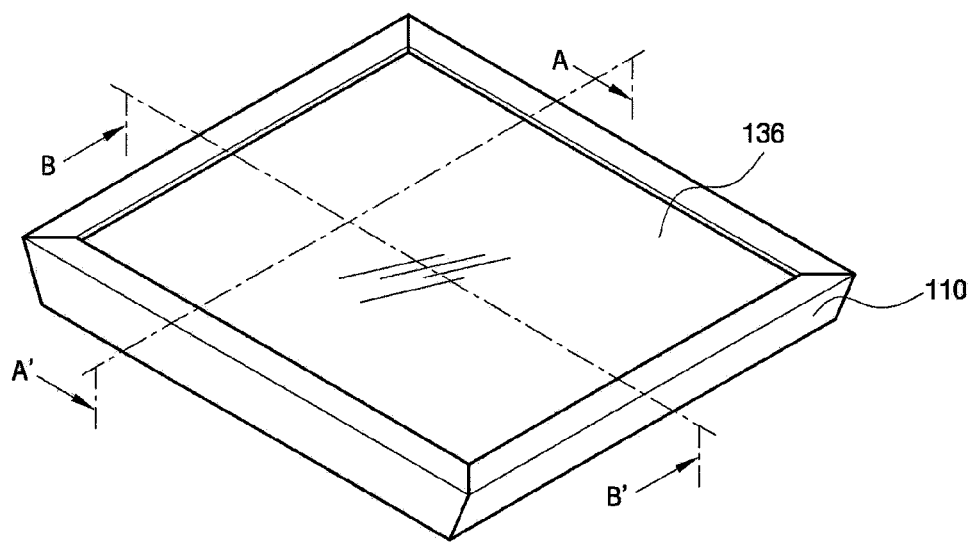
FIG. 2A illustrates a non-exploded perspective view of the LCD module illustrated in FIG. 1.
Figure 2B:
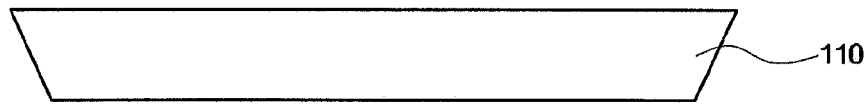
FIG. 2B illustrates a side view of the LCD module illustrated in FIG. 2A.
Figure 3A:
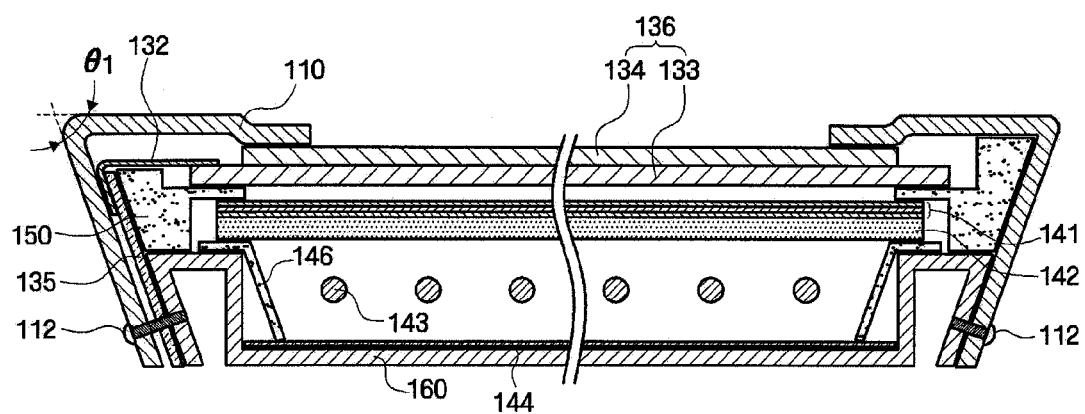
FIG. 3A illustrates a cross-sectional view taken along line A-A' of FIG. 2A.
Figure 3B:
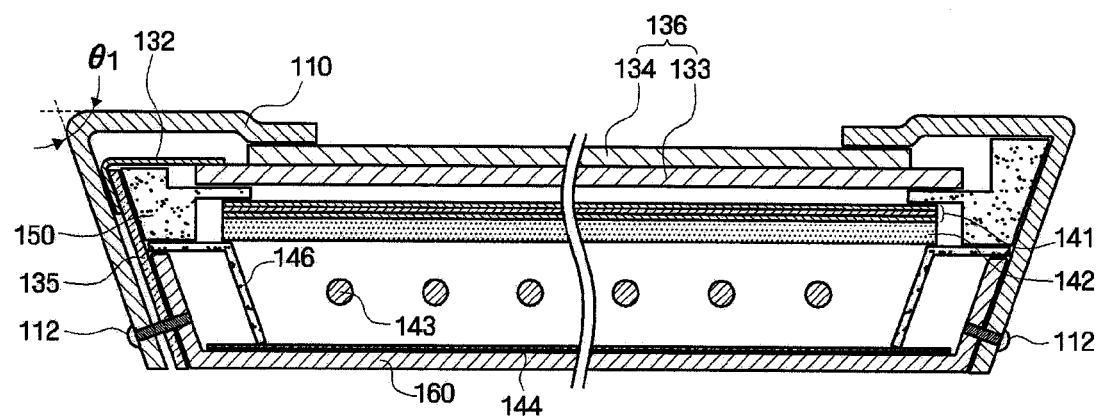
FIG. 3B illustrates a cross-sectional view of a variation of the LCD module illustrated in FIG. 3A.
Figure 3C:
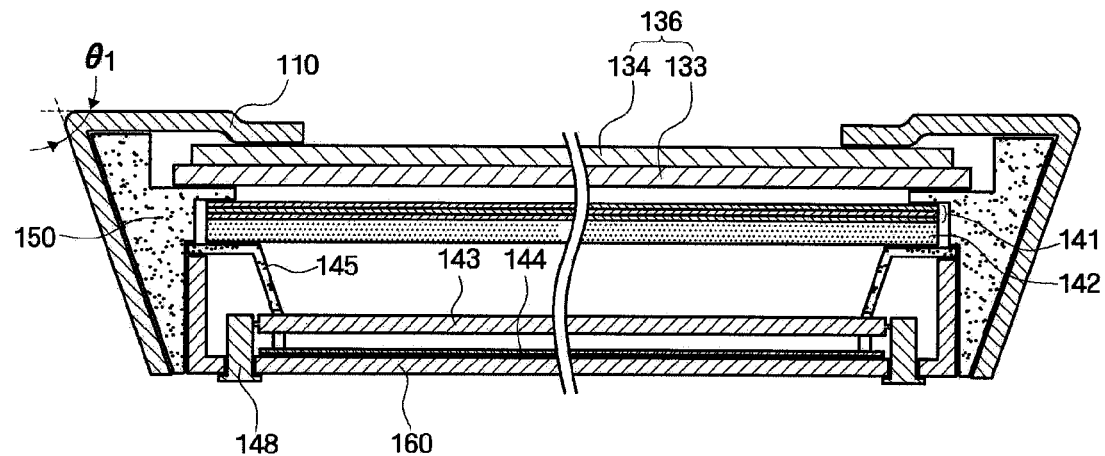
FIG. 3C illustrates a cross-sectional view taken along line B-B' of FIG. 2A.

FIG. 1 illustrates an exploded perspective view of the first LCD module 100. FIG. 2A illustrates a non-exploded perspective view of the assembled LCD module 100, FIG. 2B illustrates a side view of the assembled LCD module illustrated 200, FIG. 3A illustrates a cross-sectional view taken along line A-A' of FIG. 2A, FIG. 3B illustrates a cross-sectional view of a variation of the embodiment of FIG. 3A, and FIG. 3C illustrates a cross-sectional view taken along line B-B' of FIG. 2A.

Referring to FIGS. 1 through 3C, the LCD module 100 includes a liquid crystal flat panel sub-assembly 130, a backlight sub-assembly 140, a lower container section 160 and an upper container section 110.

Among the illustrated parts of FIG. 1 is a middle frame section 150 which can be seen to have an outer shape corresponding to a sliced section taken out of an upside down, rectangular pyramid, or more correctly, a base-parallel slice taken from an outer shell portion of such a pyramid. Similarly, it may be seen that the upper container section 110, when formed by joining together its four subsections 110a-110d takes on the shape of the shell of an upside down, frusto rectangular pyramid with a window cut out in the widest base part of such a frusto pyramid shell. Before delving into the details, it may be appreciated from this bird's eye view that the frusto pyramidically shaped upper container section somehow wraps over and around a matched frusto pyramidal shape of the lower container section 160 so that the two thereby interlock and thus cannot be readily slid apart as might, say, the rectangular cover of a conventional rectangular shoebox. These initial observations are not to be viewed as limiting the scope of invention. It will become apparent below that other mechanical interlocks may be obtained from shapes other than that of regular pyramid shapes. At least one acutely angled sidewall of the upper container section mates with an obtusely angled sidewall of the lower container section so that the upper section may not be simply and readily slid up and off the lower section as is the upper cover of a conventional shoebox.

Referring now to details shown in the drawings, the liquid crystal flat panel assembly 130 includes a liquid crystal panel subassembly 136, a plurality of gate-line driving chip packages 131 mounted on flexible film connectors, a plurality of data-line driving chip packages 132 mounted on flexible film connectors, and a printed circuit board (PCB) 135 coupled to the flexible film connectors of the data-line driving chip packages 132. The liquid crystal panel subassembly 136 includes a lower display panel 133 (sometimes also referred to as a TFT array substrate), an upper display panel 134 (sometimes also referred to as a common electrode substrate) and a liquid crystal material layer (not shown) disposed and contained between the lower display panel 133 and the upper display panel 134.

The liquid crystal panel subassembly 136 receives image data on respective data lines thereof (not shown). It also receives vertical scan pulses on respective gate lines thereof (not shown). It further includes the lower display panel 133 and the upper display panel 134. The lower display panel 133 typically includes the plurality of gate lines (not shown) and the plurality of data lines (not shown) that cross with the gate lines, as well as an array of thin-film transistors (TFT's) (not shown), and a plurality of transparent pixel electrodes (not shown). The upper display panel 134 typically includes a black-colored light blocking matrix (with holes in pixel areas thereof) and one or more common electrodes that oppose the pixel-electrodes, where the upper display panel 134 is mounted to face the lower display panel 133.

The gate chip film packages 131 are respectively connected to the gate lines on the lower display panel 133, and the data chip film packages 132 are respectively connected to the data lines on the lower display panel 133. The gate lines and the data lines are arranged for connection thereto along the edges of the lower display panel 133.

Various driving elements (e.g., integrated circuits) for applying gate-driving signals to the gate chip film packages 131, applying data-driving signals to the data chip film packages 132 or processing the gate-driving signals and the data-driving signals may be mounted on the PCB 135. Typically, the PCB 135 has a relatively rigid plate like structure. However, as seen in for example FIG. 3A, a flexible film connector such as 132 allows the PCB 135 to be disposed at an angle against a corresponding angled outer sidewall of frame 150.

The backlight assembly 140 includes a plurality of optical sheets 141 (e.g., polarizer, etc.), an optical diffusive plate 142, a plurality of lamps 143 and a reflective plate 144.

The lamps 143 function as sources of backlighting and provide light that passes through the liquid crystal panel subassembly 136 and the window opening of the upper container section 110 to form an image which can be viewed by a user (not shown). Cold cathode fluorescent lamps (CCFLs), hot cathode fluorescent lamps (HCFLs), or external electrode fluorescent lamps (EEFLs) may be used as the lamps 143. The lamps 143 are provided with a lamp-driving voltage from an appropriate voltage source and thus generate their light. The lamps 143 are evenly spaced apart and are arranged in parallel to one another. The lamps 143 may be direct-type lamps. In order to uniformly distribute a discharge gas in each of the lamps 143 and thus to achieve substantially uniform luminance, the lamps 143 may be arranged to be elongated along a longitudinal direction of the liquid crystal panel subassembly 136.

A plurality of lamp sockets 148 are respectively inserted into and fixed in a plurality of socket insertion holes (not shown) in the lower container section 160 as shown. The lamp sockets 148 removably receive, support, and fix the lamps 143 into position. The lamp sockets 148 provide the lamp-driving voltage to electrodes of the lamps 143.

In the embodiment of FIGS. 1 through 3C, the LCD module 100 uses continuous line of light sources such as the elongated lamps 143 for its backlighting. However, the present disclosure is not restricted to this form of light sourcing. That is, the LCD module 100 may alternatively or additionally use point light sources such as light-emitting diodes (LEDs) or surface light sources such as flat fluorescent lamps (FFLs). Specifically, the LCD module 100 may use a light source structure which includes at least one substrate and a plurality of LEDs disposed on the substrate.

The diffusive plate 142 may be disposed above the lamps 143. The diffusive plate 142 improves the uniformity of the luminance of light transferred from the lamps 143 to the liquid crystal panel subassembly 136. That is, the diffusive plate 142 guides and distributes light emitted from the lamps 143 toward the front of the liquid crystal panel subassembly 136 so that the light is incident upon the liquid crystal panel subassembly 136 at a wide range of angles. The diffusive plate 142 may be formed by coating both surfaces of a transparent film (e.g., an acrylic resin film) with light guiding and diffusing elements.

The reflective plate 144 may be disposed below the lamps 143. The reflective plate 144 may have a metal or other reflective upper surface that reflects light emitted from the lamps 143 upwards. In one embodiment, the reflective plate 144 is formed as one body (integrally) with the lower container section 160. That is, the lower container 160 may be formed of a highly reflective material such as polished aluminium or an aluminium alloy and may thus have internal surfaces that perform at least part of the functions of the bottom reflective plate 144.

The optical sheets 141 may be disposed on the diffusive plate 142. The optical sheets 141 further diffuse and distribute light emitted from the lamps 143. The optical sheets 141 may include a diffusive sheet, a first prism sheet and a second prism sheet. The diffusive sheet further improves the luminance of light emitted from the lamps 143 and the uniformity of the luminance of the light emitted from the lamps 143.

The first prism sheet may be disposed on the diffusive sheet. A plurality of prism patterns (e.g., refractive gratings, not shown) may be formed on one surface of the first prism sheet. The prism patterns collect and emit light diffused by the diffusive sheet. For example, a brightness enhancement film (BEF) may be used as the first prism sheet.

The second prism sheet may be disposed on the first prism sheet. The second prism sheet may be a multilayer reflective polarization prism sheet which collects, polarizes and emits polarized light. For example, a dual BEF (DBEF) may be used as the second prism sheet. The second prism sheet is optional if the first prism sheet can provide sufficient luminance, polarization, and a wide viewing angle.

The backlight assembly 140 includes the above-mentioned container frame 150 which fits into the lower container section 160 and which has inward projecting features (e.g., see 150 of FIG. 3A) for positioning the optical sheets 141, the diffusive plate 142 at desired levels relative to the liquid crystal panel subassembly 136 above and/or the lamps 143 and reflective plate 144 below.

The liquid crystal panel subassembly 136 is disposed above the optical sheets 141. The liquid crystal panel subassembly 136 is supported by the container frame 150 where the latter is contained on or around in the lower container 160.

The container middle frame 150 may include a plurality of angled outer sidewalls that form the outline of a section of a rectangular pyramid. In one embodiment (see e.g., FIG. 3A), the container frame 150 includes stepped inner portions or inwardly protruding portions, which are formed on the inner surfaces of the sidewalls of the container frame 150, and may thus support and position the liquid crystal panel subassembly 136 as desired. The sidewalls of the container frame 150 have slanted outer surfaces so as to give the appearance of being a sliced shell from a rectangular pyramid. That is, the distance between a pair of opposite outer sidewalls of the container frame 150 decreases when moving from the top of, to the bottom of the container frame 150. In the embodiment of FIGS. 1 through 3C, all the sidewalls of the container frame 150 have slanted outer surfaces. However, the disclosure is not restricted to this configuration. That is, at least one of the sidewalls of the container frame 150 may have a non-slanted outer surface (see for example FIG. 9).

The lower container section 160 includes a bottom plate which is rectangular, and a plurality of sidewalls, which are formed along the edges of the bottom plate. The lower container section 160 is shaped to hold and fix into position the optical sheets 141, the diffusive plate 142 and the liquid crystal panel 136 thereon, and the lamps 143 as well as the reflective plate 144 therein. The lower container section 160 includes ledges that may be used to prevent the optical sheets 141 from bending. The PCB 135 of the liquid crystal panel assembly 130 may be bent via the flexible film connectors 132 so that the bent PCB 135 conforms to the shape of at least one of the sidewalls of the lower container 160 as seen for example in FIG. 3A. The PCB 135 may be settled on one of the sidewalls of the lower container 160 or on a rear surface of the lower container 160. A cross section of the lower container section 160 may have a pair of double-folded, U-shaped sidewalls, and the PCB 135 may also be settled on one of the double-folded, U-shaped sidewalls. However, the present disclosure is not restricted to this configuration. That is, referring to the alternate embodiment of FIG. 3B, the sidewalls of the lower container 160 corresponding to the long sides of the liquid crystal panel 136 may have a single wall structure with no folds. Recall that FIG. 3B illustrates a cross-sectional view (taken along A-A') of a variation of the embodiment of FIG. 3A. Referring to FIG. 3B, the sidewalls of the lower container 160 form an obtuse angle with the bottom plate of the lower container 160. That is, the sidewalls of the lower container 160 may extend substantially in parallel with the acutely-angled sidewalls of the upper container 110.

The sidewalls of the lower container 160 may form an obtuse angle with the bottom plate of the lower container 160. Therefore, the sidewalls of the lower container 160 may extend substantially in parallel with the outer surfaces of the sidewalls of the container frame 150. The sidewalls of the lower container 160 corresponding to the long sides of the liquid crystal panel 136 are illustrated in FIG. 3A and 3C as being slanted, but the present disclosure is not restricted to this configuration. That is, sidewalls of the lower container 160 corresponding to the short sides of the liquid crystal panel 136 may also extend substantially in parallel with the outer surfaces of the sidewalls of the container frame 150 or the sidewalls of the upper container 110.

The area of a PCB 135 that can be accommodated by the lower container 160 is larger when the lower container 160 has slanted sidewalls than when the lower container 160 has vertically upright sidewalls. Therefore, if the lower container 160 has slanted sidewalls, the lower container 160 can accommodate a PCB 135 having a larger surface area and thus may realize more complicated circuit patterns using the PCB 135 even when the PCB 135 has a single layer structure or when the PCB 135 has a multilayer structure, but includes only a few layers (e.g., double-sided PCB).

The shape of the lower container 160 may be altered according to how optical sheets 141, the optical plate 142, the lamps 143, the reflective plate 144 and the liquid crystal panel assembly 130 are contained in the lower container 160. The lower container 160 may be formed of a conductive material such as a metal chassis.

With regard to assembly, once the reflective plate 144 and the lamps 143 are contained in the lower container 160, a pair of first side molds 145 (seen in FIG. 1) are coupled to both ends of each of the lamps 143 so that the lamps 143 can be fixed in position in the lower container 160. A pair of second side molds 146 are formed along a longitudinal direction of the lamps 143 and disposed between the lower container 160 and the lamps 143. The first side molds 145 and the second side molds 146, like the reflective plate 144, may have reflective surfaces and thus reflect light emitted from the lamps 143 upwards.

The upper container 110 may be mechanically coupled to the lower container 160 so that the liquid crystal panel assembly 130 supported in the lower container 160 can be secured by the upper container 110. In this regard, each section of the upper container 110 includes a top plate or top lip/lid which defines a window which exposes the liquid crystal panel assembly 130 for viewing of images thereof through the window. Each section 110a-110d of the upper container 110 includes a sidewall, which extends at an angle (e.g., $\theta_1$—see FIG. 3A) from the top plate or top lip/lid. The combined sidewalls of the upper container 110 may respectively extend in parallel with respective outer surfaces of the sidewalls of the container frame 150 and/or the sidewalls of the lower container 160. The top lips/lids and sidewalls of the upper container sections 110a-110d may define a V-shaped cross-section. In one embodiment, the top plate of the upper container sections 110a-d may form an acute angle $\theta_1$ with the respective sidewalls of the upper container 110.

The upper container 110 may be coupled to the lower container 160 by various means such as using rivets, hooks (not shown) or screws (shown as 112 in FIG. 3A). The upper container 110 may be coupled to the lower container 160 in various additional or other manners besides that involving the use of hooks, rivets or screws. Once the backlight assembly 140 is assembled and the liquid crystal panel assembly 130 is settled on the backlight assembly 140, the upper container 110 may be coupled to the lower container 160. As described above, the distances between a pair of opposite sidewalls of the upper container 110, between a pair of opposite sidewalls of the lower container 160 and between a pair of opposite sidewalls of the container frame 150 may decrease from the top to the bottom of the LCD module 100 and thus a slip over of one frusto-rectangular pyramid outline over the other may not be possible. Therefore, in order to effectively couple the upper container 110 to the lower container 160, the upper container 110 may be divided into a plurality of upper container parts 110a through 110d as shown. Referring to FIGS. 1 through 3A, the upper container parts 110a through 110d may be coupled to the sidewalls of the lower container 160 through screws 112 or hooks (not shown). In the embodiment of FIGS. 1 through 3C, the upper container 110 is divided into four container parts: a first pair of container parts corresponding to the long sides of the liquid crystal panel 136 and a second pair of container parts corresponding to the short sides of the liquid crystal panel 136. However, the upper container 110 may be divided into more than or less than the illustrated four upper container parts in various manners, other than that set forth herein. For example, two L-shaped top container parts may be joined to complete the containerizing upper container 110.

Figure 4A:
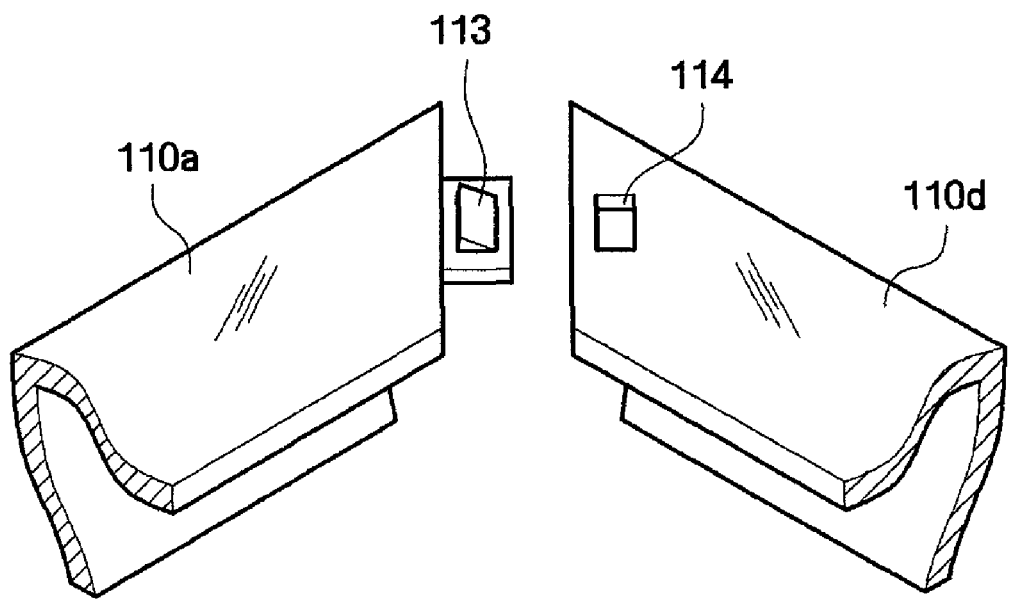
FIGS. 4A and 4B illustrate exploded perspective views for explaining how a plurality of upper container parts is coupled to each other.
Figure 4B:
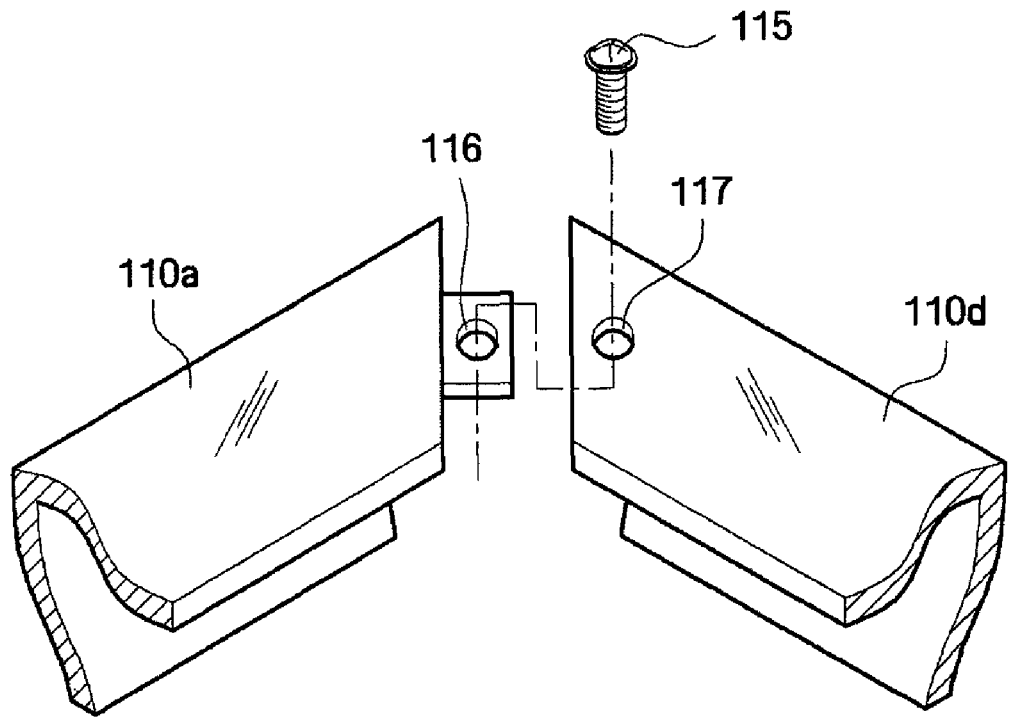

FIGS. 4A and 4B illustrate exploded perspective views for explaining how a plurality of upper container parts 110a and 110d may be assembled and interlocked one to the next at their junctures. Referring to FIGS. 4A and 4B, the upper container parts 110a and 110d may be coupled to one another by a corner screw 115 or a hook 113. For example, referring to FIG. 4A, the interlock hook 113 may be formed on the upper container part 110a, and a hook-coupling hole 114 may be defined in the upper container part 110d. The hook 113 may be inserted into the hook-coupling hole 114. Alternatively, referring to FIG. 4B, screw-coupling holes 116 and 117 may be formed on the upper container parts 110a and 110d, respectively. Then, a screw 115 may be inserted into the screw-coupling hole 117 for threaded screwing into hole 116 or pass through hole 116 to an underlying nut (not shown).

Alternatively or additionally, the upper container parts 110a through 110d may be coupled and fixed to one another by using a laser welding method, an adhesive, or a double-sided adhesive tape.

The upper container parts 110a through 110d may be coupled only to the lower container 160 and may not be directly fastened to one another. Alternatively, the upper container parts 110a through 110d may be coupled to the lower container 160 and also fastened to one another.

Once the upper container 110 is coupled to the lower container 160, the slanted sidewalls of the upper container 110 and the lower container 160 can prevent the upper container 110 from being easily detached from (slipped off from) the lower container 160 even when external shock is applied. Therefore, it is possible to improve the mechanical coupling or fastening capability between the upper container 110 and the lower container 160.

Figure 5:
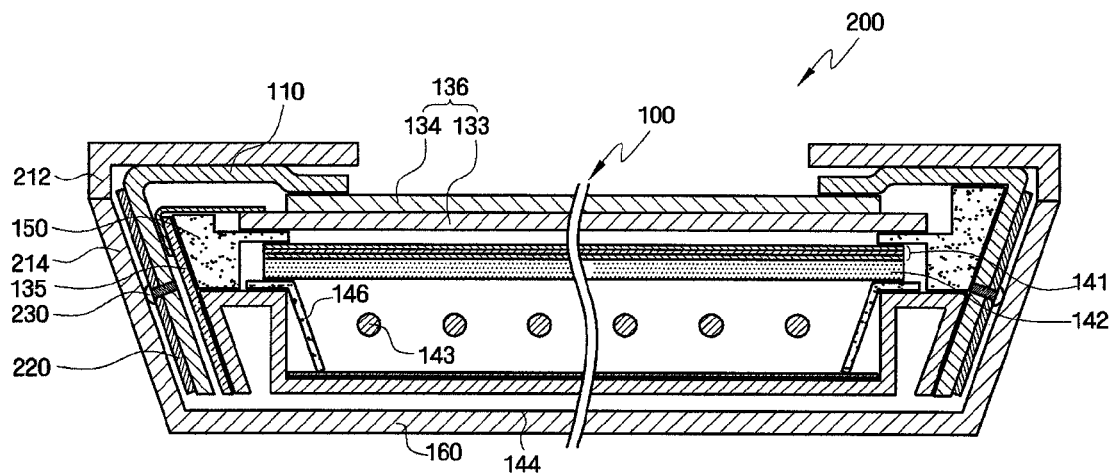
FIG. 5 illustrates a cross-sectional view of an LCD according to an embodiment.
Figure 6:
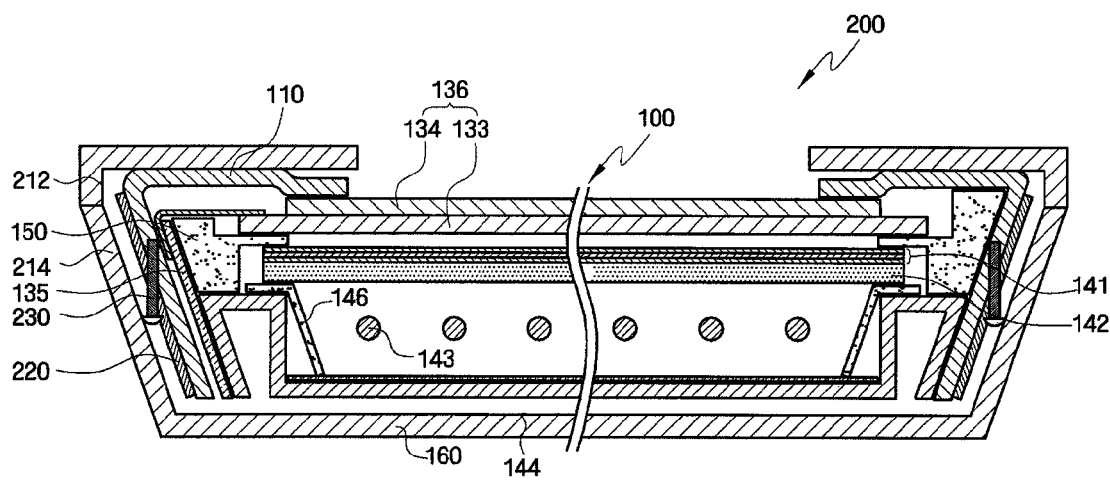
FIG. 6 illustrates a cross-sectional view of a variation of the LCD illustrated in FIG. 5.

An LCD device 200 according to a second one embodiment will hereinafter be described in detail with reference to FIGS. 5 and 6. FIG. 5 illustrates a cross-sectional view of the LCD device 200, and FIG. 6 illustrates a cross-sectional view of a variation of the LCD device 200.

Referring to FIG. 5, the LCD device 200 includes an LCD module 100, which has slanted sidewalls, and first and second outer housings 212 and 214 (e.g., made of decorative plastic) which hold the LCD module 100 therein.

The first housing 212 is disposed at the top or viewing front of the LCD module 110 and corresponds to the upper container 110. The first housing 212 has a window defined therethrough by way of which the pixel areas of the liquid crystal panel subassembly 136 are exposed. The second housing 214 is disposed at the bottom or rear of the LCD module 110 and corresponds to the lower container 160.

The LCD module 100 may be coupled to the first housing 212 or the second housing 214 by brackets 220. The brackets 220 may be coupled to the upper container 110 of the LCD module 100 by coupling elements 230. Screws may be used as the coupling elements 230. The coupling elements 230 may be inserted perpendicularly into the sidewalls of the upper container 110, as illustrated in FIG. 5. Alternatively, the coupling elements 230 may be inserted into the sidewalls of the upper container 110 perpendicularly to the top plate of the upper container 110, as illustrated in FIG. 6. The LCD module 100 may be coupled to the first housing 212 by using the brackets 220, then the coupling elements 230 may be inserted into the sidewalls of the upper container 110, and then the first housing 212 and the second housing 214 may be coupled to each other. Here, when the coupling elements 230 are inserted into the sidewalls of the upper container 110, as illustrated in FIGS. 5 and 6, the upper container 110 is still exposed. Therefore, it is possible to facilitate the insertion of the coupling elements 230 into the sidewalls of the upper container 110.

The first housing 212 or the second housing 214 may have slanted sidewalls that extend in parallel with the lateral surfaces of the LCD module 110.

Figure 7:
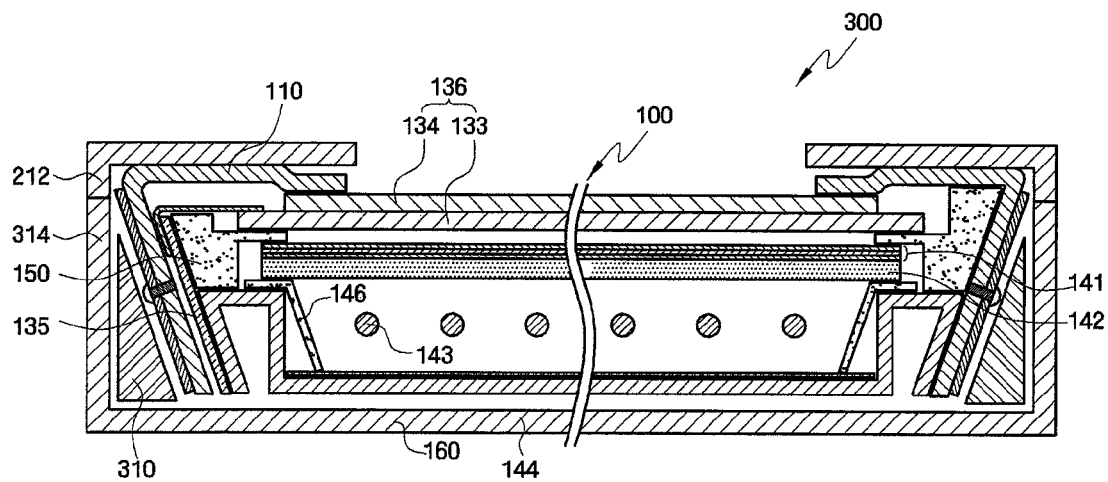
FIG. 7 illustrates a cross-sectional view of an LCD according to another embodiment.

An LCD device 300 according to another embodiment will hereinafter be described in detail with reference to FIG. 7. FIG. 7 illustrates a cross-sectional view of the LCD device 300.

Referring to FIG. 7, the LCD device 300 includes first and second housings 212 and 314 which generally form a rectangular prism. Therefore, empty spaces are generated between the sidewalls of the first or second housing 212 or 314 and the slanted lateral sides of the LCD module 100. Various filler elements 310 including those that may be necessary for the operation of the LCD device 300 may be contained in the empty spaces, thereby reducing the size of the LCD device 300. Examples of the various filler elements 310 include audio input or output devices (e.g., speakers).

Variations of the embodiments of FIGS. 1, 3A and 3C will hereinafter be described in detail with reference to FIGS. 8 through 12.

Figure 8:
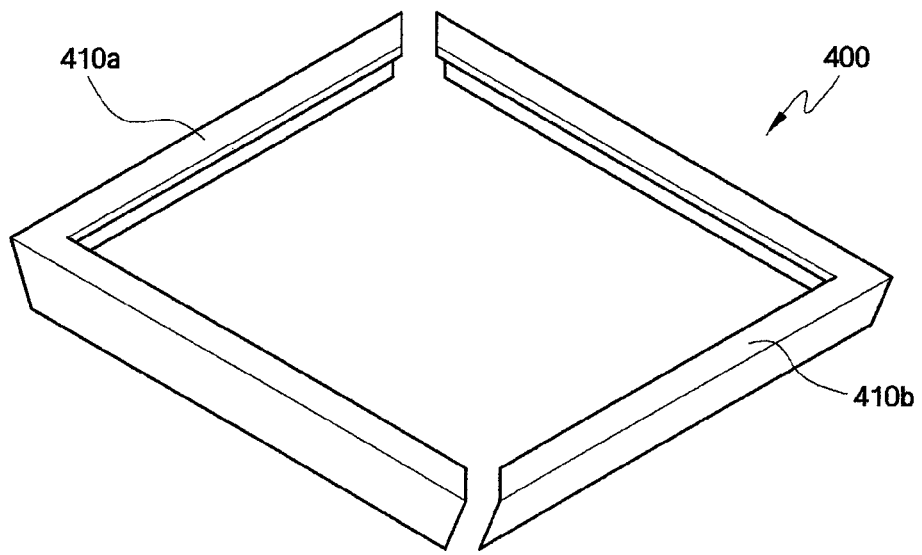
FIG. 8 illustrates a perspective view of a variation of the upper container illustrated in FIG. 2.

FIG. 8 illustrates an exploded perspective view of a variation of the upper container 110 illustrated in FIG. 2A, i.e., an upper container 400. Referring to FIG. 8, the upper container 400 may be divided into two upper container parts 410a and 410b, which are each L-shaped. In the embodiment of FIG. 8, the upper container 400 is divided diagonally, but the present disclosure is not restricted to this division. That is, the upper container 400 may be divided in various manners, other than that set forth herein and thereafter joined so as to form a frusto pyramidal or other upper container section that interlocks with a corresponding lower container section.

Figure 9:
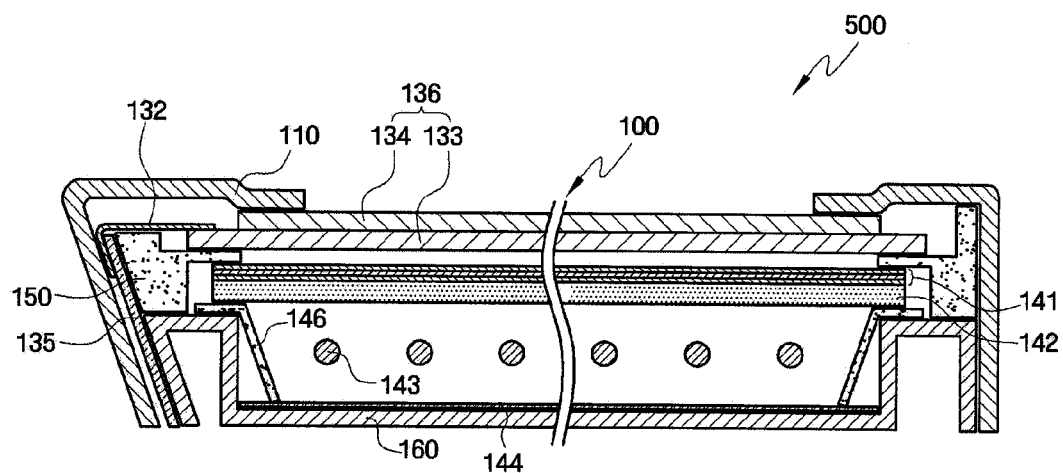
FIGS. 9 and 10 illustrate cross-sectional views of variations of the LCD module illustrated in FIG. 3A.
Figure 10:
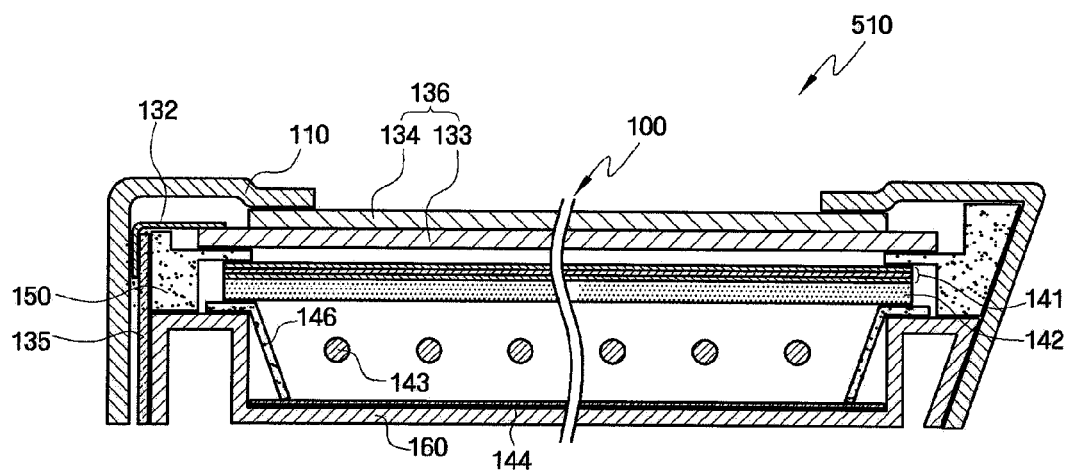

FIGS. 9 and 10 illustrate cross-sectional views of LCD modules 500 and 510, respectively, which are variations of the LCD module 100 illustrated in FIG. 3A. Referring to FIGS. 9 and 10, one of a pair of lateral surfaces of the LCD module 500 or 510 corresponding to the long sides of a liquid crystal panel 136 may be slanted. Specifically, referring to FIG. 9, a lateral side of the LCD module 500 adjacent to a PCB 135 is slanted, whereas a lateral side of the LCD module 500 on the opposite side of the PCB 135 is not slanted. Referring to FIG. 10, a lateral side of the LCD module 510 adjacent to a PCB 135 is not slanted, whereas a lateral side of the LCD module 500 on the opposite side of the PCB 135 is slanted.

Figure 11:
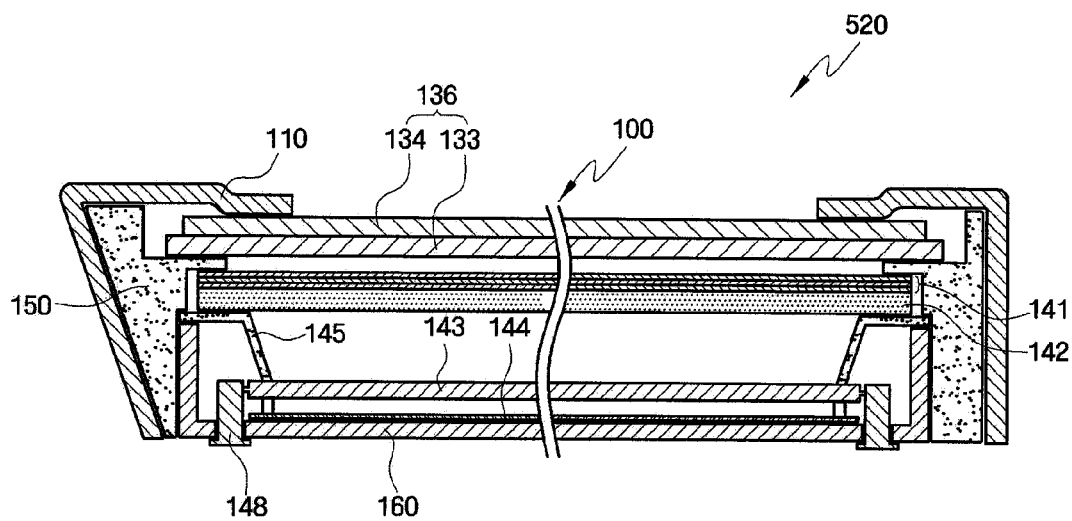
FIGS. 11 and 12 illustrate cross-sectional views of variations of the LCD module illustrated in FIG. 3C.
Figure 12:
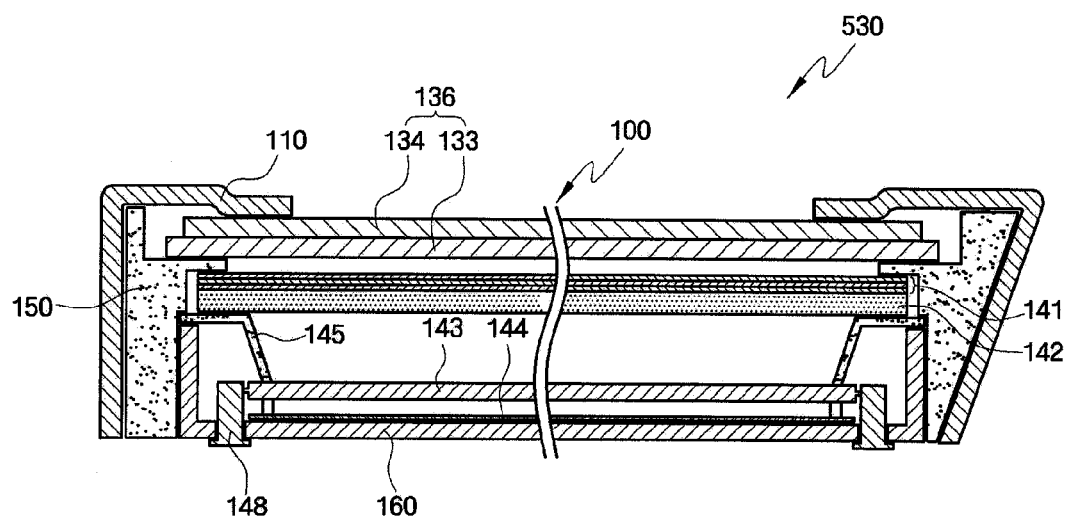

FIGS. 11 and 12 illustrate cross-sectional views of LCD modules 520 and 530, respectively, which are variations of the LCD module 100 illustrated in FIG. 3C. Referring to FIGS. 11 and 12, one of a pair of lateral surfaces of the LCD module 520 or 530 corresponding to the short sides of a liquid crystal panel 136 may be slanted.

As described above, according to the present disclosure of invention, an LCD module has interlocking upper, middle and/or lower container sections each with a respective slanted lateral surface where the lateral surfaces interlock so that the upper container section cannot be readily separated from the lower container section merely by sliding off as would the cover of a conventional shoebox from its respective box. Accordingly, when stress is applied to the module which would otherwise separate the upper and lower container sections from each other, the interlocking slanted surface lock together even more strongly as a result of the applied separation stress.

While various embodiments have been particularly shown and described herein, it will be understood by those of ordinary skill in the art that various changes in form and details may be made thereto without departing from the spirit and scope of the present disclosure.

What is claimed is:

1. A display device comprising:
a flat panel image assembly which provides an image in accordance with supplied image data;
an upper container section which comprises a top plate having a window through which the flat panel image assembly is exposed, and a plurality of sidewalls extending from along edges of the top plate of the upper container section, where at least one of the sidewalls of the upper container section forms an acute angle with the corresponding top plate edge area of the upper container section, the upper container section entrapping at least a portion of an entrapped structure contained within the upper container section, the entrapped structure including the flat panel image assembly, where said acute angle is an entrapping acute angle that entraps the entrapped structure between the top plate edge area and the at least one of the sidewalls which forms the acute angle such that the entrapped structure cannot easily slide out; and
a lower container section which comprises a bottom plate and a plurality of sidewalls extending from along edges of the bottom plate of the lower container, where the lower container section is structured to support the flat panel image assembly during assembly of the device and the lower container section is structured to be mechanically fastened to the sidewalls of the upper container section.

2. The display device of claim 1, wherein the upper container section generally has a cross-section corresponding to a trapezoid that entraps the entrapped structure by virtue of the trapezoidal cross-section of the upper container.

3. The display device of claim 1, wherein at least one of the sidewalls of the lower container section forms an obtuse angle with the bottom plate of the lower container section.

4. The display device of claim 3, wherein the at least one of the sidewalls of the lower container section extends in parallel with the at least one of the sidewalls of the upper container section.

5. The display device of claim 1, further comprising a printed circuit board (PCB) which is connected to the flat panel image assembly and is settled between one of the sidewalls of the upper container section and a corresponding one of the sidewalls of the lower container section, wherein the sidewall of the upper container section and the sidewall of the lower container section that are adjacent to the PCB extend in parallel with each other.

6. The display device of claim 1, further comprising an outer decorative housing which has a window through which the flat panel image assembly is exposed, and holds the flat panel image assembly, the upper container section and the lower container section therein, wherein the housing and the upper container section are coupled to each other by brackets and coupling elements, which are coupled to the upper container section.

7. The display device of claim 6, wherein the coupling elements are inserted perpendicularly into the at least one of the sidewalls of the upper container section.

8. The display device of claim 6, wherein the coupling elements are inserted into the at least one of the sidewalls of the upper container section perpendicularly to the top plate of the upper container section.

9. A display device comprising:
a flat panel image assembly which provides an image in accordance with supplied image data;
an upper container section which comprises a top plate having a window through which the flat panel image assembly is exposed, and a plurality of sidewalls extending from along edges of the top plate of the upper container section, where at least one of the sidewalls of the upper container section forms an acute angle with the corresponding top plate edge area of the upper container section, the upper container section entrapping at least a portion of an entrapped structure contained within the upper container section, the entrapped structure including the flat panel image assembly, where said acute angle is an entrapping acute angle that entraps the entrapped structure between the top plate edge area and the at least one of the sidewalls which forms the acute angle such that the entrapped structure cannot easily slide out; and a lower container section which comprises a bottom plate and a plurality of sidewalls extending from along edges of the bottom plate of the lower container, where the lower container section is structured to support the flat panel image assembly during assembly of the device and the lower container section is structured to be mechanically fastened to the sidewalls of the upper container section;

wherein the upper container section is divided into a plurality of separable upper container parts.

10. The display device of claim 9, wherein the upper container section is divided into four upper container parts which comprise a first pair of upper container parts corresponding to the long sides of the flat panel image assembly and a second pair of upper container parts corresponding to the short sides of the flat panel image assembly.

11. The display device of claim 9, wherein the upper container section is divided into two upper container parts which are each L-shaped.

12. The display device of claim 9, wherein the separable upper container parts are coupled to one another by screws or hooks.

13. A display device comprising:

a flat panel image assembly which provides an image in accordance with supplied image data;

an upper container section which comprises a top plate having a window through which the flat panel image assembly is exposed, and a plurality of sidewalls extending from along edges of the top plate of the upper container section, where at least one of the sidewalls of the upper container section forms an acute angle with the corresponding top plate edge area of the upper container section;

a lower container section which comprises a bottom plate and a plurality of sidewalls extending from along edges of the bottom plate of the lower container, where the lower container section is structured to support the flat panel image assembly during assembly of the device and the lower container section is structured to be mechanically fastened to the sidewalls of the upper container section; and a container frame which comprises a plurality of sidewalls, is disposed between the upper container section and the lower container section and supports the flat panel image assembly, wherein an outer surface of at least one of the sidewalls of the container frame forms an acute angle relative to the top plate of the upper container section.

14. The display device of claim 13, wherein the outer surface of the at least one of the sidewalls of the container frame extends in parallel with the at least one of the sidewalls of the upper container section.

15. An upper container structured to entrapping-wise contain an entrapped structure therein, the entrapped structure including a panel, the upper container comprising:

a top plate which has a window through which the panel is exposed, the panel providing image information; and a plurality of sidewalls which are formed along the edges of the top plate, wherein at least one of the sidewalls of the upper container forms an entrapping acute angle with the top plate of the upper container, the entrapping acute angle causing the entrapped structure to be entrapping-wise contained within the upper container, wherein the upper container is divided into a plurality of separable upper container parts.

16. A structural container for holding together and therein, subassemblies of a flat panel display module, the container comprising:

a lower container section having a base and first lateral sidewalls extending from the base; and an upper container section having a top window frame and second lateral sidewalls extending from the top window frame, where at least one of the second lateral sidewalls defines an entrapping acute angle with the top window frame, the entrapping acute angle creating an entrapping space from which a correspondingly entrapped structure cannot easily slip out;

wherein the upper and lower container sections are joined together and mechanically interlocked in an entrapped manner with one another at least by action of the at least one of the second lateral sidewalls that defines the entrapping acute angle with the top window frame.

17. The structural container of claim 16 further comprising:

a middle container section disposed between the upper and lower container sections, the middle container section having a lateral sidewall slanted at an angle corresponding to that of the at least one of the second lateral sidewalls that defines the entrapping acute angle with the top window frame.

18. The structural container of claim 16 wherein:

the upper container section has a shape corresponding to that of the shell of a first frusto rectangular pyramid; and the lower container section has a shape corresponding to that of the shell of a second frusto rectangular pyramid that is capable of being entrapped within the interior of the first frusto rectangular pyramid.

19. A container structured for protectively housing a pre-specified and viewable flat panel display substrate and associated parts thereof, the container comprising:

a substantially quadrilaterally-shaped top section having first through fourth edges defining a corresponding four sides of the substantially quadrilateral shape of the top section and having an opening defined therethrough to allow viewing of the pre-specified and viewable flat panel display substrate, the first edge being opposed to the third edge and the second edge being opposed to the fourth edge and the first and third edges defining a hypothetical flat plane that includes the first and third edges;

first through fourth sidewalls, each respectively extending contiguously and substantially downwardly from a corresponding one of the first through fourth edges of the top section;

wherein at least one of the first through fourth sidewalls is slanted inwardly so as to define an acute angle with said hypothetical flat plane, the acute angle being sufficiently small so as to block the pre-specified flat panel display substrate and its associated parts from easily sliding out of the container, when housed by the container, in a direction normal to said hypothetical flat plane.

20. The container of claim 19 wherein at least two opposed ones of the first through fourth sidewalls are slanted inwardly so as to define respective acute angles with said hypothetical flat plane.

21. The container of claim 19 wherein each of the first through fourth sidewalls is slanted inwardly so as to define a respective acute angle with said hypothetical flat plane and where each of the respective acute angles is sufficiently small so as to block the pre-specified flat panel display substrate and its associated parts from easily sliding out of the container, when housed by the container, in a direction normal to said hypothetical flat plane.

22. The container of claim 19 wherein the container is formed of two or more initially separated and thereafter joined components, the joining of the components occurring so as to at the same time entrap the pre-specified flat panel display substrate and its associated parts within the formed container, where the entrapping includes entrapment by the inwardly slanted one or more sidewalls of the container, and wherein two or more of the initially separated and thereafter joined components each includes at least part of one of the first through fourth sidewalls and the respective top section edge from which the corresponding sidewall part contiguously extends.

\* \* \* \* \*